United States Patent
Yoon

(10) Patent No.: US 8,024,751 B2
(45) Date of Patent: Sep. 20, 2011

(54) TURNTABLE HAVING CLAWS

(75) Inventor: Ho Eop Yoon, Suwon-si (KR)

(73) Assignee: LG Innotek Co., Ltd., Seoul (KR)

( * ) Notice: Subject to any disclaimer, the term of this patent is extended or adjusted under 35 U.S.C. 154(b) by 949 days.

(21) Appl. No.: 11/759,802

(22) Filed: Jun. 7, 2007

(65) Prior Publication Data

US 2007/0294713 A1 Dec. 20, 2007

(30) Foreign Application Priority Data

Dec. 30, 2005 (KR) .................. 10-2005-0135088

(51) Int. Cl.
- G11B 17/03 (2006.01)
- G11B 17/028 (2006.01)
- G11B 19/20 (2006.01)

(52) U.S. Cl. .................. 720/712; 720/707; 720/714

(58) Field of Classification Search .................. 720/706, 720/707, 712, 714
See application file for complete search history.

(56) References Cited

U.S. PATENT DOCUMENTS

| | | | | |
|---|---|---|---|---|
| 4,737,948 A * | 4/1988 | Okita | | 720/712 |
| 4,787,079 A * | 11/1988 | Ueno | | 720/707 |
| 6,205,111 B1 * | 3/2001 | Hayakawa | | 720/707 |
| 6,208,613 B1 * | 3/2001 | Iizuka | | 720/707 |
| 7,036,135 B2 * | 4/2006 | Hsu et al. | | 720/707 |
| 2008/0059984 A1 * | 3/2008 | Kanzawa et al. | | 720/707 |

* cited by examiner

*Primary Examiner* — Daniell L Negron
*Assistant Examiner* — Adam B Dravininkas
(74) *Attorney, Agent, or Firm* — Saliwanchik, Lloyd & Eisenschenk

(57) ABSTRACT

A turntable of a recording medium drive can include a coupler having an inner circumference to which a rotating shaft is fixed, and an outer circumference onto which a disk is inserted; a table extending outwardly from the outer circumference of the coupler and for mounting the disk thereon; and first and second claws elastically supporting the disk by making contact with a clamping region of the disk. In an embodiment, the distance from the center of the rotating shaft to an outer surface of the first claws making contact with the clamping region of the disk is longer than the distance from the center of the rotating shaft to an outer surface of the second claw making contact with the clamping region of the disk.

19 Claims, 5 Drawing Sheets

US 8,024,751 B2

TURNTABLE HAVING CLAWS

BACKGROUND

In general, recording medium drives record data in a recording medium or reproduce recorded data from the recording medium.

A recording medium drive incorporates a turntable on which the recording medium is placed, and a spindle motor rotating the turntable.

BRIEF SUMMARY

Embodiments of the present invention can provide a turntable for a recording medium drive.

According to an embodiment, a turntable can include a coupler having an inner circumference to which a rotating shaft is fixed and an outer circumference onto which a disk is inserted; a table extending outwardly from the outer circumference of the coupler and for mounting the disk thereon; and first and second claws elastically supporting the disk by making contact with a clamping region of the disk. The distance from the center of the rotating shaft to an outer surface of the first claw making contact with the clamping region of the disk can be longer than the distance from the center of the rotating shaft to an outer surface of the second claws making contact with the clamping region of the disk.

According to another embodiment, a turntable can include a coupler having an inner circumference to which a rotating shaft is fixed and an outer circumference onto which a disk is inserted; a table extending outwardly from the outer circumference of the coupler and mounting the disk thereon; and first and second claws elastically supporting the disk by making contact with a clamping region of the disk. The first claw can have a shape different from a shape of the second claw.

According to yet another embodiment, a turntable can include a coupler having an inner circumference to which a rotating shaft is fixed and an outer circumference onto which a plurality of disks having clamping region inner diameters different from each other can be inserted; a table extending outwardly from the outer circumference of the coupler and for mounting a disk thereon; and first and second claws elastically supporting the disk by contact with a clamping region of the disk. When one of the disks is inserted onto the coupler, the first claw makes contact with the clamping region of the disk, and as the disk rotates, the first and second claws make contact with the clamping region of the disk.

DETAILED DESCRIPTION

Hereinafter, turntables according to embodiments of the present invention will be described with reference to the accompanying drawings.

Figure 1:
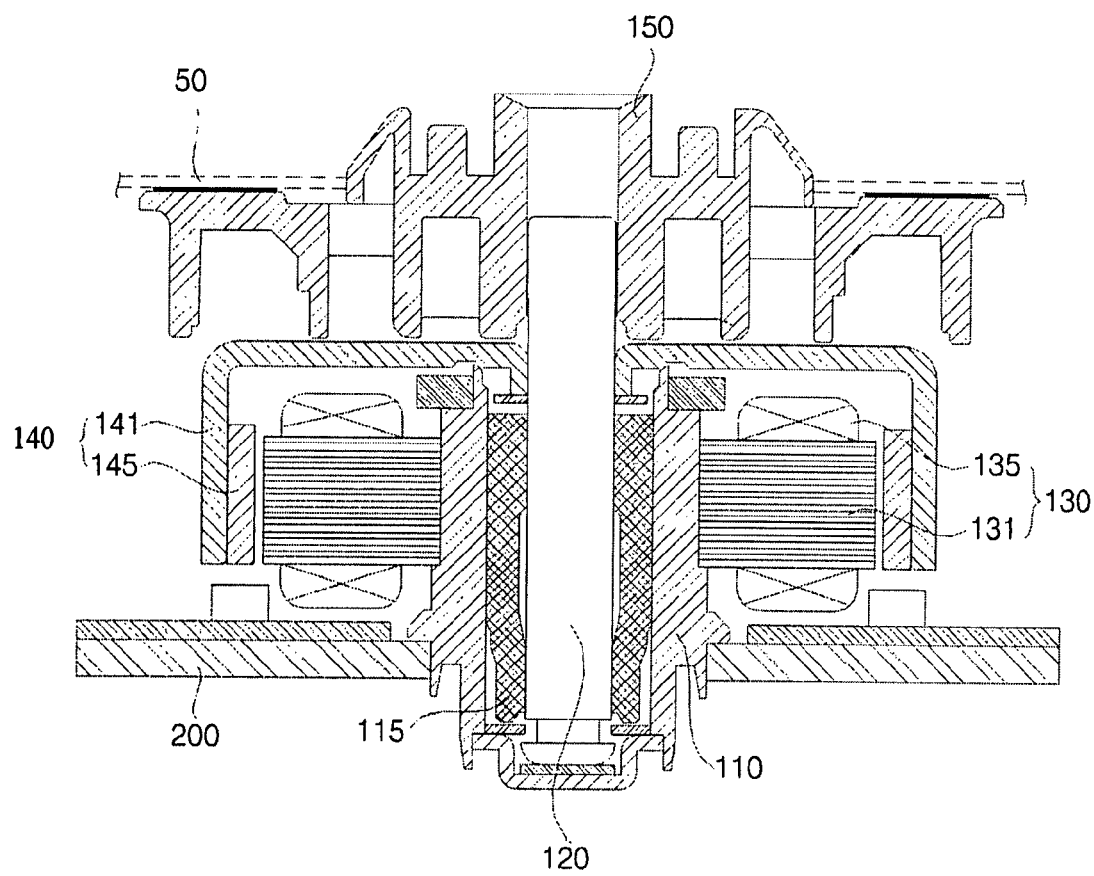
FIG. 1 is a cross-sectional view of a recording medium drive including a turntable according to an embodiment.

FIG. 1 is a cross-sectional view illustrating a recording medium drive to which a turntable according to an embodiment is applied.

As illustrated in FIG. 1, a recording medium drive has a bearing housing 110 that has the shape of a cylinder, the top of which is open, and is erectly installed on a base 200. A bearing 115 is installed in the bearing housing 110.

A rotating shaft 120 is inserted and supported in the bearing 115 on a lower side thereof, and is exposed above the bearing housing 110 on an upper side thereof.

A stator 130 is fixed to an outer circumference of the bearing housing 110, and a rotor 140 is fixed to the rotating shaft 120 exposed above the bearing housing 110.

The stator 130 includes a core 131 fixed to the outer circumference of the bearing housing 110, and a coil 135 wound around the core 131.

The rotor 140 has the shape of a cylinder, the bottom of which is open, and is fixed to the rotating shaft 120. The rotor 140 includes a rotor yoke 141 enclosing the stator 130, and a magnet 145 that is attached to an inner circumference of the rotor yoke 141 and faces the core 131.

When external electric power is supplied to the coil 135, the rotor 140 is rotated by the action of an electric field generated from the coil 135 and a magnetic field generated from the magnet 145, and thus rotates the rotating shaft 120.

A turntable 150 can be inserted onto and fixed to the rotating shaft 120 above the rotor 140, and a disk 50 can be mounted and elastically supported on the turntable 150.

The turntable 150 according to an embodiment can function to properly, elastically support a disk 50 having various inner diameters without damage to the turntable 150.

In an embodiment, the center of the disk 50 can be prevented from deviating from the center of the turntable 150 beyond a setup value due to the eccentricity of the disk 50 itself caused by high-speed rotation of the turntable 150.

Figure 2:
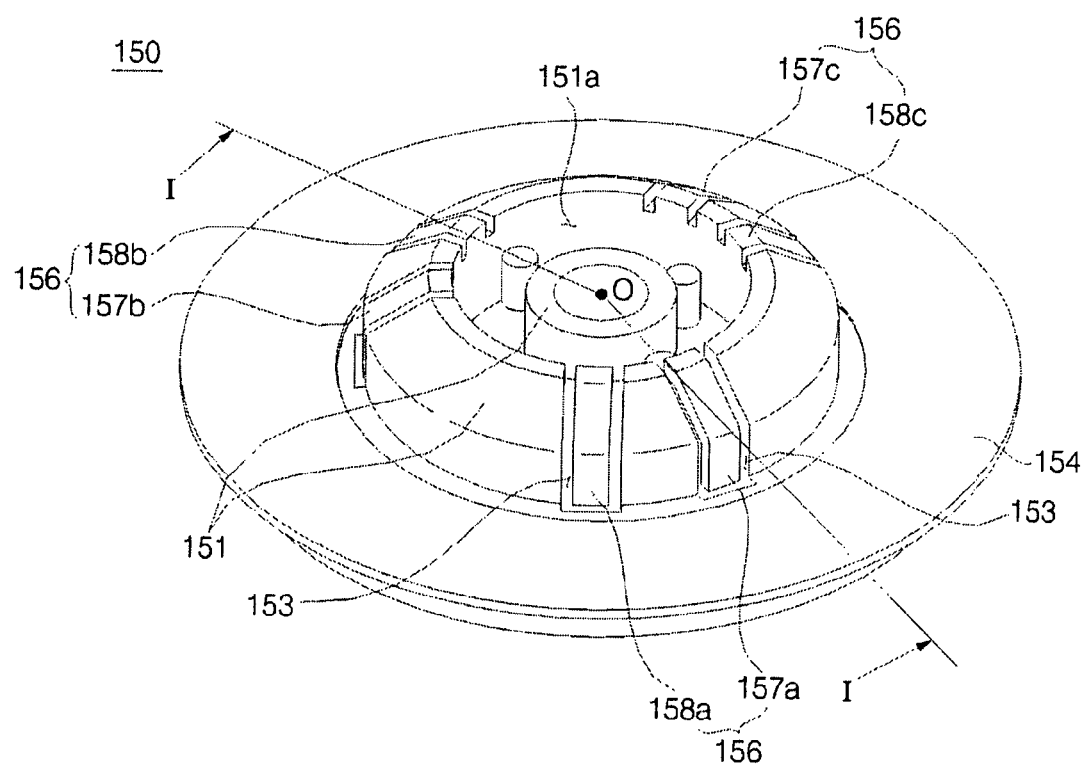
FIG. 2 is a perspective view of a turntable according to an embodiment.
Figure 3:
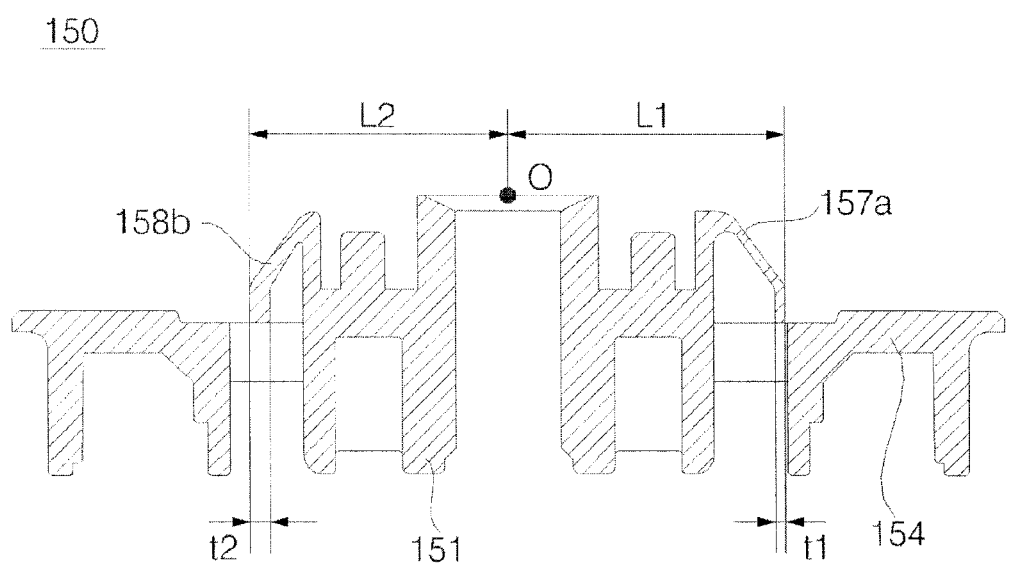
FIG. 3 is a cross-sectional view taken along line I-I of FIG. 2.

FIG. 2 is a perspective view illustrating a turntable according to an embodiment, and FIG. 3 is a cross-sectional view taken along line I-I of FIG. 2.

Referring to FIG. 2, the turntable 150 can include a coupler 151, a table 154, and a plurality of claws 156.

The coupler 151 can have the shape of a tube. The shape of the coupler can allow the rotating shaft 120 to be press-fitted and fixed into the coupler's inner circumference. An outer circumference of the coupler 151 can be tapered in an outward and downward direction of the rotating shaft 120. This tapering can allow a disk 50 to be stably lowered along the outer circumference of the coupler 151.

An annular recess 151a may be formed between the inner and outer circumferences of the coupler 151 if necessary. A metal piece (not shown) or a clamping magnet (not shown) can be fixed to the annular recess 151a.

The table 154 extends outwardly from the outer circumference of the coupler 151 in a ring shape, and the disk 50 can be mounted on the table 154.

The claws 156 can include a plurality of first claws 157a, 157b and 157c and a plurality of second claws 158a, 158b and 158c. The first and second claws 157a, 157b, 157c and 158a, 158b, 158c can be formed on the outer circumference of the coupler 151.

In a specific embodiment, a plurality of channels 153 can be formed in the outer circumference of the coupler 151 and an inner circumference of the table 154. The first and second claws 157a, 157b, 157c and 158a, 158b, 158c can be respectively surrounded by the channels 153.

Each of the first and second claws 157a, 157b, 157c and 158a, 158b, 158c can be integrally formed with the coupler 151 at an upper end thereof, and can be cantilevered at a lower end thereof adjacent to the inner circumference of the table 154.

Each of the first and second claws 157a, 157b, 157c and 158a, 158b, 158c can be tapered in the same profile as the outer circumference of the coupler 151, and can be brought into contact with an inner circumference of the disk 50, i.e. at a clamping region of the disk 50.

In the turntable according to an embodiment described above, each claw 156 has been described as being integrally formed with the coupler 151. However in another embodiment, each claw 156 can be extended from the rotor yoke 141 to contact a clamping region at an outer circumference of a disk 50. In a further embodiment, each claw 156 can be installed together with a spring so as to have a resilient force.

However, in order to describe features of the claws 156, FIGS. 1, 2 and 3 illustrate an example in which the claws are integrally formed with the coupler 151.

In the turntable according to an embodiment, the first claws 157a, 157b, 157c have a different characteristic from the second claws 158a, 158b, 158c.

In a specific embodiment, the first and second claws 157a, 157b, 157c and 158a, 158b, 158c can be formed at the coupler 151 at a uniform interval. The second claws can be located between adjacent first claws. For example, second claw 158a can be located between first claws 157a and 157b, second claw 158b can be located between first claws 157b and 157c, and second claw 158c can be located between first claws 157c and 157a.

Referring to FIG. 3, a distance L1 from the center O of the coupler 151 to an outer surface of a first claw 157a, 157b, 157c for contact with the clamping region of the disk 50 is longer than the distance L2 from the center O of the coupler 151 to an outer surface of a second claw 158a, 158b, 158c for contact with the clamping region of the disk 50.

For example, when the clamping region of the disk 50 has an inner diameter from 15.00 mm to 15.15 mm, the distance L1 can be set to a range from 7.575 mm, to 7.600 mm, and the distance L2 can be set to a range from 7.500 mm to 7.525 mm.

A thickness t1 between inner and outer surfaces of a first claw 157a, 157b, 157c can be smaller than the thickness t2 between inner and outer surfaces of a second claw 158a, 158b, 158c. The difference in thicknesses t1 and t2 can provide the second claws 158a, 158b, 158c with a rigidity stronger than that of the first claws 157a, 157b, 157c.

The operation of elastically supporting a disk 50 on a turntable according to an embodiment will be described below.

First, it may be assumed that the inner diameter of the clamping region of the disk 50 amounts to 15.00 mm, i.e. half of the inner diameter of the clamping region of the disk 50 is 7.50 mm.

In this case, because the distance L1 from the center O of the coupler 151 to the outer surface of the first claws 157a, 157b, 157c and the distance L2 from the center O of the coupler 151 to the outer surface of the second claws 158a, 158b, 158c are longer than half of the inner diameter of the clamping region of the disk 50, both the outer surfaces of the first claws 157a, 157b, 157c and the outer surfaces of the second claws 158a, 158b, 158c can be in contact with the clamping region of the disk 50, and thus elastically support the disk 50.

Here, because the distance L1 from the center O of the coupler 151 to the outer surface of the first claws 157a, 157b, 157c is longer than L2, the first claws 157a, 157b, 157c are relatively more deformed when being in contact with the clamping region of the disk 50. However, the first claws 157a, 157b, 157c can be thin to exert a relatively high elastic force, so that the elastic force thereof is not reduced by plastic deformation.

In addition, because the distance L2 from the center O of the coupler 151 to the outer surface of the second claws 158a, 158b, 158c is shorter than L1, the second claws 158a, 158b, 158c are relatively less deformed when being in contact with the clamping region of the disk 50. However, the second claws 158a, 158b, 158c can be thick to have greater rigidity, so that they firmly support the disk 50.

Accordingly, for a case in which a disk 50 having a small inner diameter is inserted, when the turntable 150 is stopped or is rotating at a low speed, the first and second claws 157a, 157b, 157c and 158a, 158b, 158c elastically support the disk 50 to match the center of the disk 50 with the center of the turntable 150.

In a case in which the center of the disk 50 tends to deviate from the center of the turntable 150 due to the eccentricity of the disk 50 itself caused by high-speed rotation of the turntable 150, the first and second claws 157a, 157b, 157c and 158a, 158b, 158c elastically support the disk 50 to match the center of the disk 50 with the center of the turntable 150.

Next, for a clamping region of a disk 50 mounted and supported on the turntable 150 having an inner diameter of 15.15 mm, i.e. half of the inner diameter of the clamping region of the disk 50 is 7.575 mm, the distance L1 from the center O of the coupler 151 to the outer surface of the first claws 157a, 157b, 157c can be longer than the half of the inner diameter of the clamping region of the disk 50, and the distance L2 from the center O of the coupler 151 to the outer surface of the second claws 158a, 158b, 158c can be shorter than the half of the inner diameter of the clamping region of the disk 50.

Thus, in the case in which the turntable 150 is stopped or is rotating at a low speed, the disk 50 is elastically supported by the first claws 157a, 157b, 157c. Although the disk 50 is elastically supported only by the first claws 157a, 157b, 157c, the center of the disk 50 is matched with the center of the turntable 150.

In addition, when the turntable 150 rotates at a high speed, the eccentricity of the disk 50 itself overcomes the elastic force of the first claws 157a, 157b, 157c, so that the disk 50 tends to deviate from the center of the turntable 150.

However, when the center of the disk 50 tends to deviate from the center of the turntable 150 beyond a setup value, the disk 50 can be elastically supported by the second claws 158a, 158b, 158c having a greater rigidity, so that the center of the disk 50 does not deviate from the center of the turntable 150. At this time, the first claws 157a, 157b, 157c are relatively more deformed, but are not damaged due to flexibility thereof.

Because the turntable 150 generally rotates at a high speed of 10,500 rpm, embodiments of a turntable should have good support performance on the disk at the high speed, as well as guarantee long-term durability at the high speed.

Thus, a recording medium drive according to an embodiment can elastically support the disk 50 within the setup value irrespective of the inner diameter of the disk 50 and the rotating speed of the turntable 150. Further, the first claws 157a, 157b, 157c that are relatively more deformed can have a relatively higher elastic force, so that the durability of the recording medium drive is improved.

Figure 4:
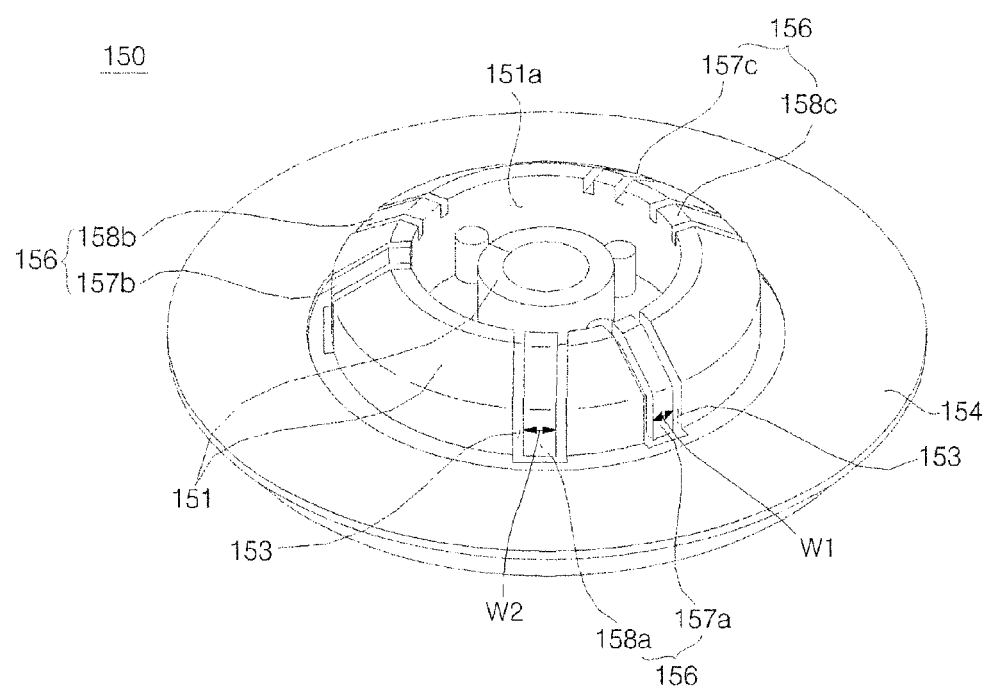
FIG. 4 is a perspective view of a turntable according to an embodiment.

FIG. 4 is a view illustrating a turntable according to another embodiment.

Referring to FIG. 4, a turntable 150 can be adapted so that the rigidity thereof can be adjusted by forming the first claws 157a, 157b, 157c with a different width from the second claws 158a, 158b, 158c instead of different thicknesses as described with reference to FIGS. 2 and 3.

In an embodiment, the width w1 of a first claw 157a, 157b, 157c can be smaller than the width w2 of a second claw 158a, 158b, 158c. Thus, the first claws 157a, 157b, 157c can have rigidity lower than that of the second claws 158a, 158b, 158c.

Figure 5:
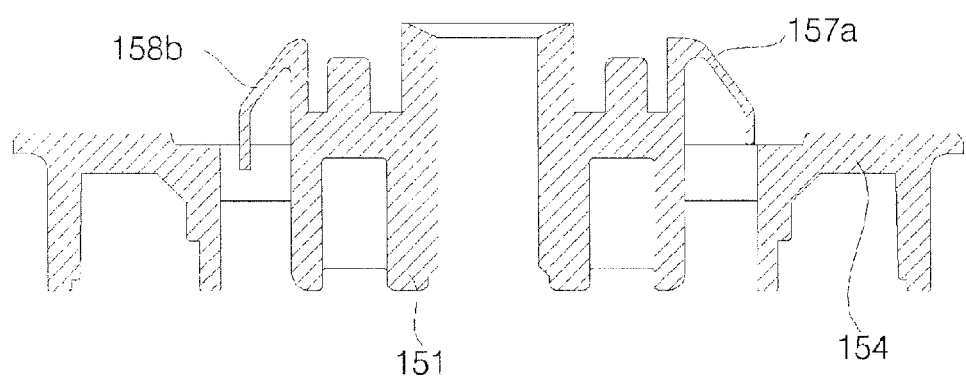
FIG. 5 is a cross-sectional view of a turntable according to an embodiment.

FIG. 5 is a cross-sectional view illustrating a turntable according to yet another embodiment.

Referring to FIG. 5, a turntable 150 can be adapted so that the rigidity thereof can be adjusted by forming the first claws 157a, 157b, 157c having a different length from the second claws 158a, 158b, 158c.

In an embodiment, the length of a first claw 157a, 157b, 157c can be smaller than the length of a second claw 158a, 158b, 158c. Thus, the first claws 157a, 157b, 157c have rigidity lower than that of the second claws 158a, 158b, 158c.

In a turntable according to an embodiment as described above, in a case in which the disk having a small inner diameter is mounted on the turntable, the disk can be elastically supported by the first claws 157a, 157b, 157c, where the first claws have a longer distance than the second claws from the center of the turntable to the outer circumference which contacts the disk, and by the second claws 158a, 158b, 158c, where the second claws have a shorter distance from the center of the turntable to the outer circumference which contacts the disk, irrespective of the rotating speed, etc. of the turntable.

In a case in which a disk having a large inner diameter is mounted on the turntable, the disk can be elastically supported by the first claws 157a, 157b, 157c when the turntable is stopped or is rotating at a low speed, and then additionally by the second claws 158a, 158b, 158c when the turntable rotates at a high speed.

In embodiments the first claws 157a, 157b, 157c can have rigidity lower than that of the second claws 158a, 158b, 158c.

In embodiments the first claws 157a, 157b, 157c can have a thickness smaller than that of the second claws 158a, 158b, 158c.

In embodiments the first claws 157a, 157b, 157c can have a width smaller than that of the second claws 158a, 158b, 158c.

In embodiments the first claws 157a, 157b, 157c can have a length smaller than that of the second claws 158a, 158b, 158c.

The first claws 157a, 157b, 157c have been disclosed as having different rigidity from the second claws 158a, 158b, 158c. However, the first claws 157a, 157b, 157c may have the same rigidity as the second claws 158a, 158b, 158c.

Further, the first claws 157a, 157b, 157c may have rigidity higher than that of the second claws 158a, 158b, 158c.

With this construction, a turntable according to embodiments can elastically support a disk to match the center of the disk with the center thereof irrespective of the inner diameter of the clamping region of the disk, the rotating speed thereof, and so on.

Further, the first claws, which may become more deformed by the high-speed rotation of the turntable depending on the inner diameter of the disk, can have a relatively high elastic force, so that the durability of the turntable is improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A turntable comprising:
   a coupler having an inner circumference for fixing a rotating shaft therein, and an outer circumference, onto which a disk is to be inserted;
   a table extending outwardly from the outer circumference of the coupler for mounting the disk thereon; and
   first and second claws for elastically supporting the disk by making contact with an inner circumference of the disk, wherein the first and second claws are spaced from the table,
   wherein a first distance between the center of the inner circumference and an outer surface of the first claw for making contact with the inner circumference of the disk is longer than a second distance between the center of the inner circumference and an outer surface of the second claw for making contact with the inner circumference of the disk.

2. The turntable according to claim 1, wherein the first claw has a first thickness smaller than a second thickness of the second claw.

3. The turntable according to claim 1, wherein the first and second claws are formed on the coupler at a uniform interval.

4. The turntable according to claim 1, wherein the first and second claws comprise three first claws and three second claws.

5. The turntable according to claim 1, wherein the first distance is in a range from 7.575 mm to 7.600 mm.

6. The turntable according to claim 1, wherein the second distance is in a range from 7.500 mm to 7.525 mm.

7. The turntable according to claim 1, wherein the first and second claws are integrally formed with the coupler.

8. The turntable according to claim 1, wherein an opening is disposed between the coupler and the table, and
   wherein the first and second claws are disposed above the opening.

9. A recording medium drive comprising:
   a base;
   a bearing housing installed on the base;
   a bearing installed in the bearing housing;
   a rotating shaft inserted and supported in the bearing;
   a stator disposed around the bearing housing;
   a rotor fixed to the rotating shaft at a portion of the rotating shaft exposed above the hearing housing; and
   a turntable fixed to the rotating shaft,
   wherein the turntable includes a coupler having an inner circumference for directly fixing the rotating shaft therein, and an outer circumference onto which a disk is to be inserted;
   a table extending outwardly from the outer circumference of the coupler for mounting the disk thereon; and first and second claws for elastically supporting the disk by making contact with an inner circumference of the disk, wherein the first and second claws are spaced from the table, wherein a portion of the first claw contacting the inner circumference of the disk has a shape different from a shape of a portion of the second claw contacting the inner circumference of the disk.

10. The recording medium drive according to claim 9, wherein the portion of the first claw contacting the inner circumference of the disk has a thickness smaller than the thickness of the portion of the second claw contacting the inner circumference of the disk.

11. The recording medium drive according to claim 9, wherein an opening is disposed between the coupler and the table, and wherein the first and second claws are disposed above the opening.

12. A turntable comprising:

a coupler having an inner circumference and an outer circumference;

a table extending outwardly from the outer circumference of the coupler; and first and second claws integrally formed with the coupler at an upper end thereof and cantilevered at a lower end thereof, wherein the first and second claws are spaced from the table, wherein a first distance between a center of the coupler and an outer surface of the first claw for making contact with an inner circumference of a disk is longer than a second distance between the center of the coupler and an outer surface of the second claw for making contact with the inner circumference of the disk, wherein a portion of the first claw contacting the inner circumference of the disk has a thickness smaller than a thickness of a portion of the second claw contacting the inner circumference of the disk.

13. The turntable according to claim 12, wherein the outer circumference of the coupler is tapered in an outward and downward direction of a center of the inner circumference of the coupler.

14. The turntable according to claim 12, wherein the coupler includes an annular recess formed between the inner and outer circumferences of the coupler.

15. The turntable according to claim 12, wherein the first and second claws are formed on the coupler at a uniform interval.

16. The turntable according to claim 12, wherein the first and second claws are three in number, respectively.

17. The turntable according to claim 12, wherein the first distance is a range from 7.575 mm to 7.600 mm.

18. The turntable according to claim 12, wherein the second distance is in a range from 7.500 mm to 7.525 mm.

19. The turntable according to claim 12, wherein an opening is disposed between the coupler and the table, and wherein the first and second claws are disposed above the opening.

* * * * *